(12) United States Patent
Katoh et al.

(10) Patent No.: US 7,389,968 B2
(45) Date of Patent: Jun. 24, 2008

(54) PROPORTIONAL SOLENOID VALVE CONTROL DEVICE

(75) Inventors: Takemi Katoh, Tokyo (JP); Kazumi Makita, Tokyo (JP)

(73) Assignee: Koganei Corporation, Tokyo (JP)

( * ) Notice: Subject to any disclaimer, the term of this patent is extended or adjusted under 35 U.S.C. 154(b) by 0 days.

(21) Appl. No.: 11/547,148

(22) PCT Filed: Mar. 3, 2005

(86) PCT No.: PCT/JP2005/003639

§ 371 (c)(1),
(2), (4) Date: Sep. 29, 2006

(87) PCT Pub. No.: WO2005/098295

PCT Pub. Date: Oct. 20, 2005

(65) Prior Publication Data

US 2007/0215826 A1    Sep. 20, 2007

(30) Foreign Application Priority Data

Mar. 31, 2004   (JP) .............................. 2004-104721

(51) Int. Cl.
*F16K 31/02* (2006.01)
(52) U.S. Cl. .............................. 251/129.04; 251/129.08; 361/152
(58) Field of Classification Search ............ 251/129.04, 251/129.08, 129.15; 361/152
See application file for complete search history.

(56) References Cited

U.S. PATENT DOCUMENTS

| | | | |
|---|---|---|---|
| 3,307,824 A * | 3/1967 | Weisheit | 251/129.08 |
| 3,469,590 A * | 9/1969 | Barker | 251/129.08 |
| 3,517,680 A * | 6/1970 | Flanagan et al. | 251/129.08 |
| 3,946,284 A * | 3/1976 | Dieringer | 251/129.08 |
| 3,949,278 A * | 4/1976 | Kinnard et al. | 361/152 |
| 4,017,056 A * | 4/1977 | Schwalenstocker et al. | 251/129.08 |

(Continued)

FOREIGN PATENT DOCUMENTS

JP    08-303629    11/1996

(Continued)

OTHER PUBLICATIONS

Taiwanese Office Action dated Dec. 18, 2007.

(Continued)

*Primary Examiner*—John Bastianelli
(74) *Attorney, Agent, or Firm*—McCormick, Paulding & Huber LLP

(57) ABSTRACT

In a proportional solenoid valve control device, a mode selecting switch has an auto-mode position for sending a control signal from a level converting section to a driving signal amplifying section, a valve fully-closing manual position for supplying a valve fully-closing signal to the driving signal amplifying section, and a valve fully-opening manual position for supplying a valve fully-opening signal to the driving signal amplifying section. With the mode selecting switch set at the valve fully-closing manual position, a value of the valve fully-closing driving signal can be adjusted. With the mode selecting switch set at the valve fully-opening manual position, a value of the valve fully-opening driving signal can be adjusted. This makes it possible to easily perform an initial setting operation of the proportional solenoid valve by a valve controller.

4 Claims, 3 Drawing Sheets

U.S. PATENT DOCUMENTS

| | | | | |
|---|---|---|---|---|
| 4,967,781 A * | 11/1990 | Baron | ................... | 251/129.08 |
| 5,024,417 A * | 6/1991 | Voxbrunner | ........... | 251/129.04 |
| 5,638,863 A * | 6/1997 | Whang et al. | .......... | 251/129.08 |
| 5,724,223 A * | 3/1998 | Feuser et al. | ................. | 361/152 |
| 5,787,915 A * | 8/1998 | Byers et al. | ............ | 251/129.04 |
| 5,915,667 A * | 6/1999 | Kim et al. | .............. | 251/129.08 |
| 6,217,080 B1 | 4/2001 | Imai | | |
| 6,364,281 B1 * | 4/2002 | DeLand et al. | ......... | 251/129.04 |
| 2003/0165038 A1 * | 9/2003 | Ahrendt | ...................... | 361/152 |

FOREIGN PATENT DOCUMENTS

| | | |
|---|---|---|
| JP | 2000-081914 | 3/2000 |
| JP | 2001-159333 | 6/2001 |
| JP | 2002-313753 | 10/2002 |
| KR | 1998-60173 | 1/2000 |
| TW | 347835 | 12/1998 |

OTHER PUBLICATIONS

Office Action issued in corresponding Korean patent application, dated Sep. 19, 2007.

* cited by examiner

PROPORTIONAL SOLENOID VALVE CONTROL DEVICE

TECHNICAL FIELD

The present invention relates to a proportional solenoid valve control devices and, in particular, to a control device for outputting a driving signal to a proportional solenoid valve, wherein an initial setting of the proportional solenoid valve control device can be performed by a manual operation.

BACKGROUND ART

In a manufacturing line for manufacturing mass products such as industrial products, a number of proportional solenoid valves are used for controlling flow rates and pressures of fluid. For example, in Japanese Patent Laid-Open Publication No. 2002-313753, a proportional solenoid valve is used for controlling an amount of cutting water supplied to a processing unit of a dicing apparatus. Fluid to be controlled by the proportional solenoid value includes a gas such as air, an inert gas, and vapor and a liquid such as water, heated water, a chemical solution, and oil. The proportional solenoid valve includes a valve body for adjusting a valve opening degree in a fluid flow path and a solenoid for generating an electromagnetic force in proportion to a driving signal supplied to a coil. A spring force in a direction of closing the fluid flow path is applied to the valve body by a spring member, so that the electromagnetic force generated at the solenoid against the spring force allows the valve body to open the fluid flow path and also allows the valve opening degree to change continuously in proportion to magnitude of the electromagnetic force.

A valve controller for controlling the driving signal is disposed near the proportional solenoid valve. The driving signal to be supplied from this valve controller to the coil of the proportional solenoid valve is controlled by this valve controller. When the proportional solenoid valve is used in a manufacturing line for manufacturing mass products, the driving signal is sent from the valve controller so that the valve body of the proportional solenoid valve can take any opening degree within a range of a valve fully-closing state to a valve fully-opening state, on the basis of a command signal which is inputted from a main controller such as a personal computer or other computers and corresponds to the valve opening degree. In a manufacturing line in which many proportional solenoid valves are used, for example, a command signal is inputted from one main controller in accordance with each valve controller of the proportional solenoid valves, so that the respective proportional solenoid valves are driven individually.

The command signal from the main controller to each valve controller depends on a characteristic of the main controller, and there are, for example, the case where a 4 to 20 mA current loop signal is outputted as a command signal and the case where a voltage signal within a range of 0 to 10 V is outputted as a command signal. For this reason, the valve controller is provided with an input signal selecting switch so that even when either command signal is inputted to the valve controller, the driving signal of the valve opening degree corresponding to the command signal can be outputted to the proportional solenoid valve. Therefore, for example, when a 4 mA current signal as the command signal for setting the valve opening degree at the valve fully-closing state is inputted from the main controller, the driving signal corresponding to a valve fully-closing state is outputted from the valve controller to the coil of the proportional solenoid valve, and if a 20 mA current signal is inputted, the driving signal corresponding to a valve fully-opening state is outputted from the valve controller to the proportional solenoid valve. Similarly, when a 0 V voltage signal as a command signal for setting the valve opening degree at the valve fully-closing state is inputted, the driving signal corresponding to a valve fully-closing state is outputted to the coil, and when a 10 V voltage signal is inputted, the driving signal corresponding to the valve fully-opening state is outputted to the coil.

DISCLOSURE OF THE INVENTION

Meanwhile, the valve opening degree of the proportional solenoid valve is set based on the driving signal supplied to the coil, so that by taking standard pressure as a criterion, the controller is set so as to output a standard drive signal corresponding to a 4 to 20 mA current loop signal or a 0 to 10 V voltage signal at a time of manufacturing the valve controller. However, when the proportional solenoid valve is used in a user's manufacturing line, a relation between the valve opening degree and the driving signal may vary depending on primary-side pressure supplied to an input port of the proportional solenoid valve. For example, even when the driving signal supplied to the coil is constant, the valve opening degree may vary depending on the pressure of the fluid. Therefore, when the proportional solenoid valve is installed on the user's manufacturing line or replaced by a new proportional solenoid valve or furthermore when the user's manufacturing line is set up after maintenance of the proportional solenoid valve, it is required that a relation between a value of the driving signal supplied to the coil and the actual valve opening degree is checked for carrying out the initial setting of a value of the driving signal outputted from the valve controller to the coil. An operation for this initial setting is performed by setting a driving signal at a time when the valve opening degree of the proportional solenoid valve becomes in the fully closing state and a driving signal at a time when the valve opening degree becomes in the valve fully-opening state. Once the values of the driving signals in the valve fully-opening and -closing states are set, a driving signal having an intermediate value therebetween is outputted based on the value of the command signal from the main controller, thereby making it possible to control the valve at any opening degree.

As described above, many proportional solenoid valves are used on the user's manufacturing line. The command signals may be outputted to many proportional solenoid valves, for example, approximately 48 valves from one main controller to operate them individually. In order to perform an initial setting operation after maintenance or replacement of any of the proportional solenoid valves, a command signal for instructing the valve opening degree to be in the valve fully-closing state is inputted from the main controller to the valve controller and it is then checked whether the proportional solenoid valve becomes in the fully closed state. Furthermore, a signal for instructing the valve opening degree to be in the valve fully-opening state is inputted and it is then checked whether the proportional solenoid valve becomes in the valve fully-opening state. By doing so, the value of the driving signal when the proportional solenoid valve becomes in the fully-closing state and the value of the driving signal when the proportional solenoid valve becomes in the valve fully-opening state are adjusted. Once the driving signals at times of being in the valve fully-closing state and the valve fully-opening state are adjusted, the driving signal of an intermediate opening degree is set at an intermediate value corresponding to the value of the command signal.

However, such an initial setting operation of the proportional solenoid valve control device requires receiving, from the main controller, the command signal at the time of being in the valve fully-closing state and the command signal at the time of being in the valve fully-opening state, so that the operation requires being performed while the main controller is being operated. Therefore, there is a problem of low operability.

An object of the present invention is to be capable of easily performing an initial setting operation to a valve controller for controlling a proportional solenoid valve.

A proportional solenoid valve control device according to the present invention, which outputs a driving signal corresponding to a command signal to a solenoid for driving a valve body to control an opening degree of a fluid flow path by the valve body, comprises: a driving signal control circuit including a valve fully-closing variable resistor that sets a fully-closing value of the driving signal based on a control signal corresponding to a valve fully-closing state and a valve fully-opening variable resistor that sets a fully-opening value of the driving signal based on a control signal corresponding to a valve fully-opening state, the driving signal control circuit converting the control signal corresponding to a valve opening degree to the driving signal and supplying it to the proportional solenoid valve; and a mode selecting switch set at an auto-mode position for converting the control signal to the driving signal and supplying the driving signal to the proportional solenoid valve, a valve fully-closing manual position for supplying a valve fully-closing manual signal corresponding to a valve fully-closing position of the proportional solenoid valve to the driving signal control circuit, and a valve fully-opening manual position for supplying a valve fully-opening manual signal corresponding to a valve fully-opening position of the proportional solenoid valve to the driving signal control circuit, wherein under a state where the mode selecting switch is set at the valve fully-closing manual position, a value of the driving signal at a time of a valve fully-closing state is corrected by the valve fully-closing variable resistor, and under a state where the mode selecting switch is set at the valve fully-opening manual position, the value of the driving signal at the time of the valve fully-opening state is corrected by the valve fully-opening variable resistor.

The proportional solenoid valve control device according to the present invention further comprises a level converting section converting, based on an inputted command signal, a level of the command signal to generate a control signal. Also, the proportional solenoid valve control device according to the present invention further comprises an input switching section converting, to a semi-normalized signal corresponding to the valve opening degree, the inputted command signal irrespectively of whether a current loop or voltage signal, and outputting the semi-normalized signal to the level converting section. Further, the proportional solenoid valve control device according to the present invention further comprises an operational amplifier performing feedback control to the driving signal supplied to the proportional solenoid valve based on a solenoid current detection value from the proportional solenoid valve.

According to the present invention, under a state where the mode selecting switch provided in the driving signal output circuit for outputting the driving signal to the proportional solenoid valve is switched to the valve fully-closing manual position, the control signal for setting the valve opening degree at the valve fully-closing state is corrected by the valve fully-closing variable resistor. Also, under a state where the mode selecting switch is switched to the valve fully-opening manual position, the control signal for setting the valve opening degree at the valve fully-opening state is corrected by the valve fully-opening variable resistor. Therefore, the initial settings of the control signal for setting the proportional solenoid valve at the valve fully-closing state and the control signal for setting it at the valve fully-opening state can be performed by the control device without inputting the command signal to the control device from the main controller.

BEST MODE FOR CARRYING OUT THE INVENTION

Figure 1:
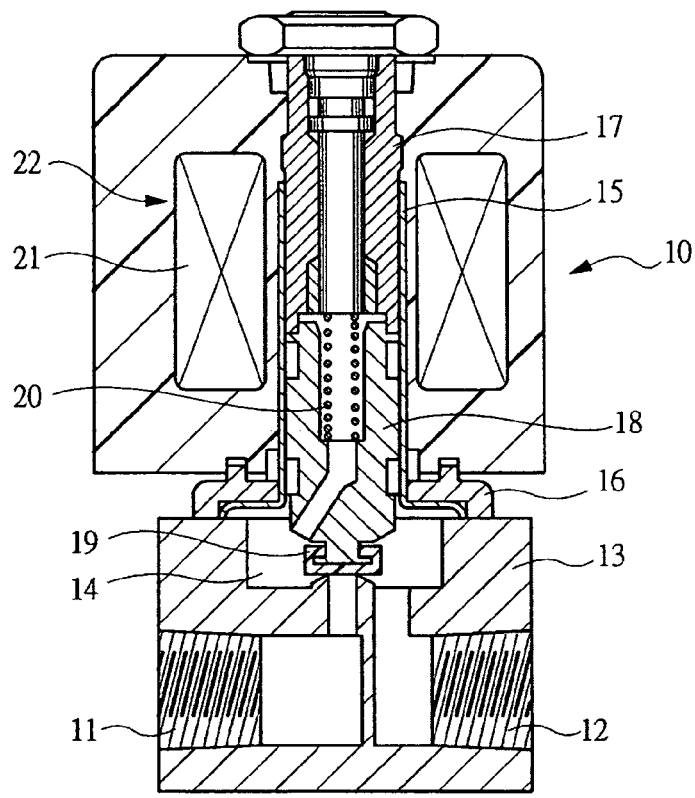
FIG. 1 is a partly-broken front view showing an example of a proportional solenoid value.

As shown in FIG. 1, a proportional solenoid valve 10 includes a joint block 13 in which a primary port 11 and a secondary port 12 are formed. A communication hole 14 communicating with the primary port 11 and the secondary port 12 is formed in the joint block 13. An armature guide tube 15 is attached to the joint block 13 by a fixing flange 16 so as to block the communication hole 14. In the guide tube 15, a stopper 17 is fixed and also a plunger 18 is axially movably incorporated. A rubber-made valve body 19, which contacts with a valve seat provided in the joint block 13 and opens/closes the communication hole 14, is attached to a tip of a plunger 18. In order to apply a closing force of the valve body 19 to the valve seat, a compression coil spring 20 is incorporated in the plunger 18. A solenoid 22 around which a coil 21 is wound is attached outside the guide tube 15. When a driving signal is supplied to the coil 21, the plunger 18 is moved against the spring force in a direction of separating from the valve seat, and the valve body 19 separates from the valve seat, whereby the primary port 11 communicates with the secondary port 12 via the communication hole 14.

FIG. 1 shows a state where the valve body 19 contacts with the valve seat and the communication hole 14 is closed, that is, a valve fully-closing state. Depending on the value of the driving signal with respect to the coil 21, the valve body 19 is operated in a valve fully-closing state, a valve fully-opening state, and at a position of having any intermediate opening degree between both states. Therefore, when this proportional solenoid valve 10 is used for controlling a flow rate of the fluid, the flow rate of the fluid flowing from the primary port 11 toward the secondary port 12 is controlled depending on the valve opening degree. When the proportional solenoid valve 10 is used for controlling the pressure of the fluid, the pressure of the fluid discharged toward the secondary port 12 is controlled depending on the valve opening degree.

Figure 2:
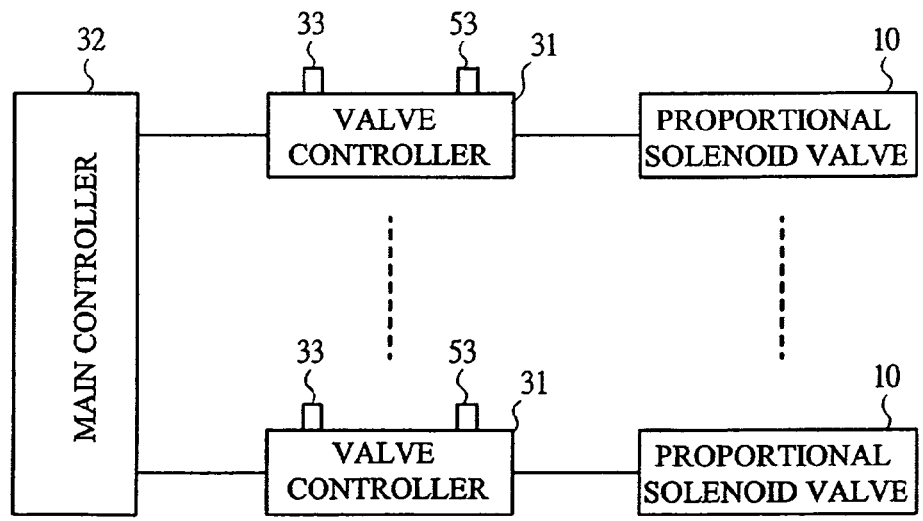
FIG. 2 is a block diagram showing a proportional solenoid valve control circuit.

FIG. 2 is a block diagram showing a control circuit of a proportional solenoid valve 10 for used on a user's manufacturing line for industrial products. In each of many proportional solenoid valves 10, the driving signal is supplied to the coil 21 from a valve controller 31 and a command signal is sent to the valve controller 31 from a main controller 32. From the main controller 32 to the respective proportional solenoid valves 10, command signals corresponding to the valve fully-closing state, the valve fully-opening state, and a position of a valve intermediate opening degree are outputted. Such a command signal may be a 4 to 20 mA current loop signal or may be a 0 to 10 V voltage signal in accordance with a kind of the main controller 32.

Figure 3A:
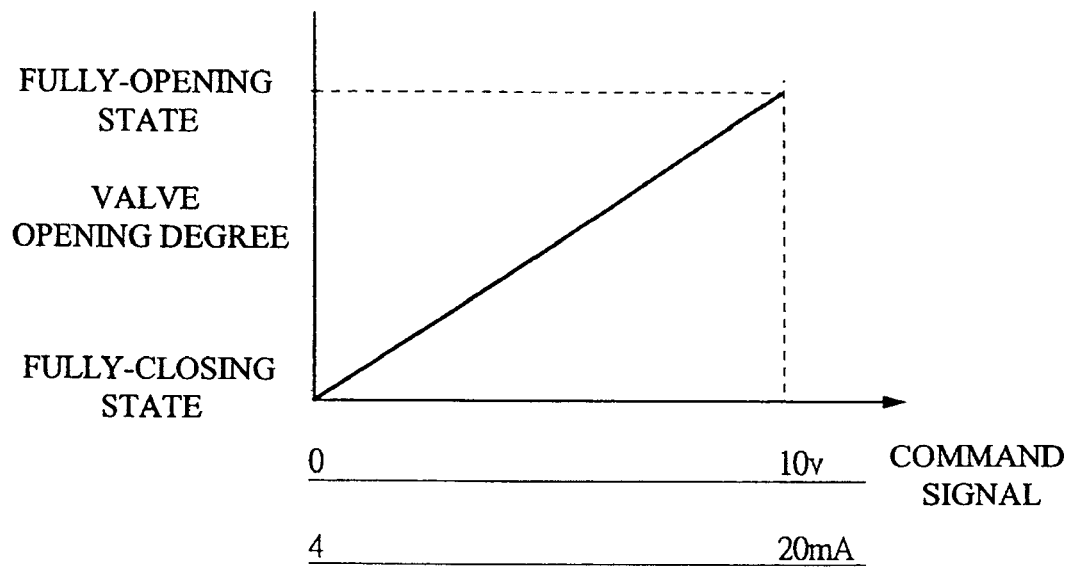
FIG. 3A is a valve characteristic diagram showing a relation between a command signal and a valve opening degree and FIG. 3B is a valve characteristic diagram showing a relation between a driving signal and the valve opening degree.

FIG. 3A is a valve characteristic diagram showing a relation between the command signal and the valve opening degree. When the main controller 32 outputs a current loop signal as a command signal, a current of 4 mA is outputted as a command signal if the valve is to be fully closed and a current of 20 mA is outputted if the valve is to be fully opened. When any current signal between both states is outputted, the valve becomes in a state of having any opening degree corresponding to the command signal. Also, in the case where the main controller 32 outputs a voltage signal as a command signal, a voltage of 0 V is outputted as a command signal when the valve is to be fully closed, whilst a voltage of 10 V is outputted when the valve is to be fully opened. If any voltage signal between the respective states is outputted, the valve becomes at any opening degree corresponding to the command signal.

Figure 3B:
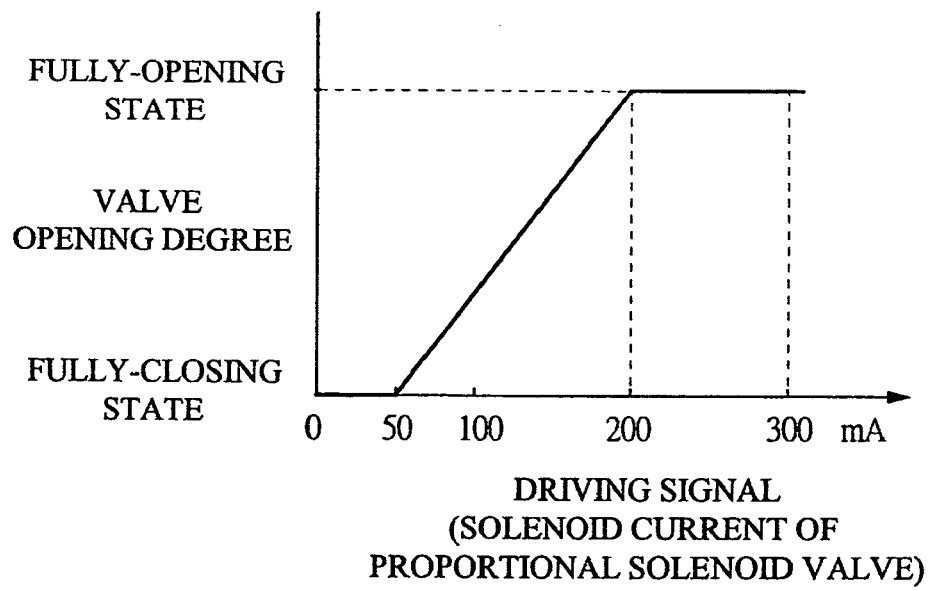

FIG. 3B is a characteristic diagram showing one example of a valve opening degree and a driving signal to be supplied to the proportional solenoid valve 10. The valve opening degree of the proportional solenoid valve 10 is different depending on a size of the proportional solenoid valve 10 or the like. For example, as shown in FIG. 3B, when a driving signal equal to or smaller than a current of 50 mA is supplied to the coil 21 of the proportional solenoid valve 10, the valve opening degree becomes in a valve fully-closing state. When a driving signal exceeding a current of 50 mA is supplied, the valve opening degree begins to open from the valve fully-closing state and when a driving signal corresponding to a current of 200 mA is supplied, the valve opening degree becomes in the valve fully-opening state.

Figure 4:
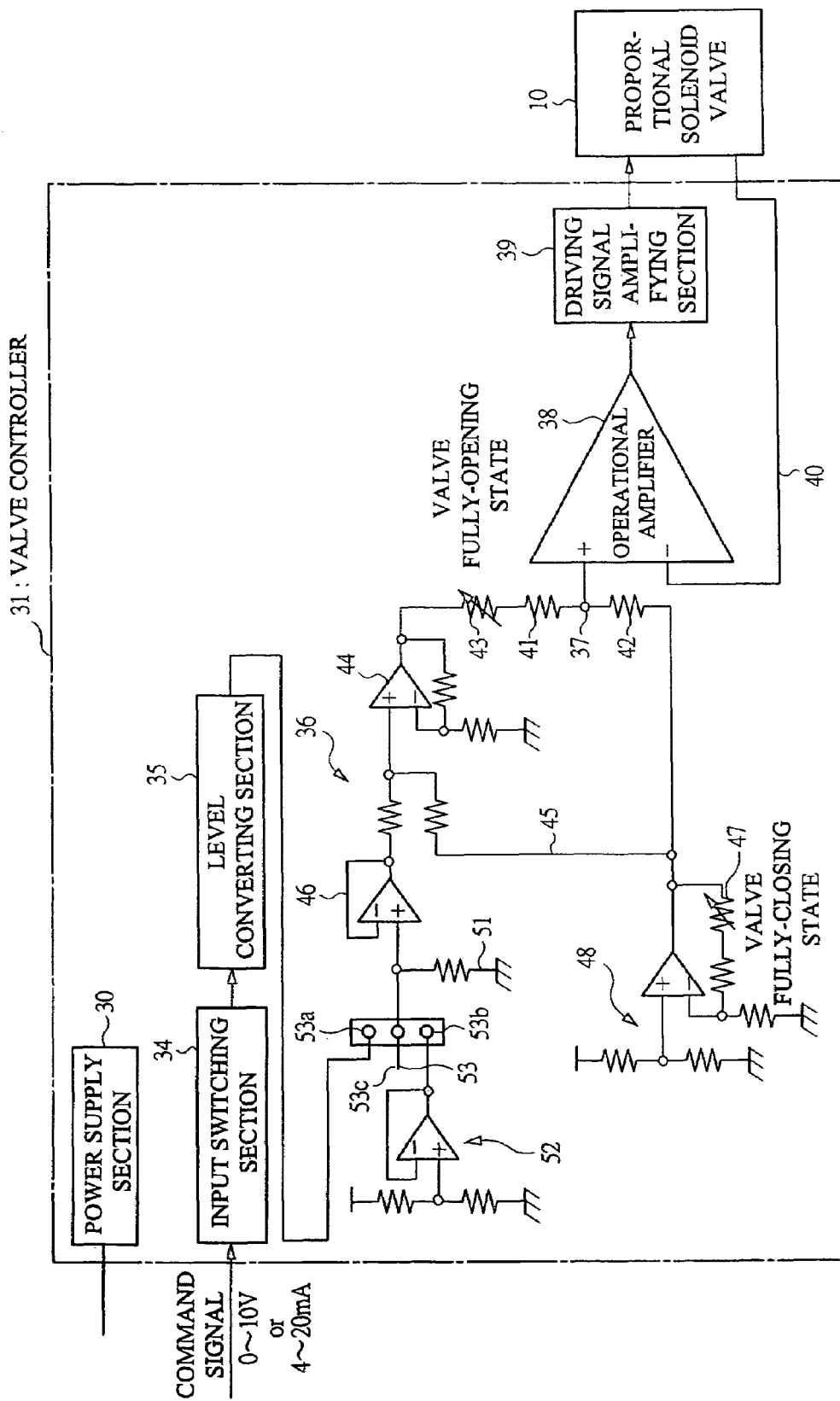
FIG. 4 is a control circuit diagram showing an internal structure of a valve controller.

FIG. 4 is a control circuit diagram showing an internal circuit of the valve controller 31 shown in FIG. 2. The valve controller 31 operates by power supplied to a power supply section 30 from an external power supply unit. As described above, there are the case where a voltage signal is received as a command signal from the main controller 32 to the valve controller 31 and the case where a current loop signal is received as a command signal therefrom. In accordance with the kind of the command signal, the input selecting switch 33 provided on the valve controller 31 as shown in FIG. 2 is operated by an operator. An input switching section 34 actuated by an operation of the input selecting switch 33 is incorporated in the valve controller 31. Even if the voltage signal is inputted as a command signal and if the current loop signal is inputted as a command signal, this input switching section 34 generates a semi-normalized signal of a voltage value corresponding to each valve opening degree.

The semi-normalized signal is sent to a level converting section 35, and the semi-normalized signal is converted to a control signal corresponding to the valve opening degree. The level converting section 35 outputs a 0 V control signal as a control signal when the command signal indicates the valve fully-closing state. The level converting section 35 outputs a control signal of, for example, 1 V when the command signal indicates the valve fully-opening state. The level converting section 35 outputs a control signal corresponding to the valve opening degree when the command signal indicates any opening degree between the valve fully-closing and fully-opening states.

The valve controller 31 includes a driving signal control circuit 36 for supplying a driving signal corresponding to the valve opening degree to the coil 21 of the proportional solenoid valve 10 in accordance with the value of the control signal from the level converting section 35. A connecting point 37 of the driving signal control circuit 36 is connected via an operational amplifier 38 to a driving signal amplifying section 39, and a driving signal corresponding to the valve opening degree of the command signal is outputted to the coil 21 of the proportional solenoid valve. A current flowing through the coil 21 varies depending on temperatures. Therefore, in order to compensate for temperature changes, a feedback signal of a solenoid current detection value is sent from the proportional solenoid valve 10 through a signal line 40 to the operational amplifier 38, and the driving signal is feedback-controlled.

The driving signal control circuit 36 includes: two fixed resistors 41 and 42 connected in series via the connecting point 37; and a circuit 45 having a buffer 44 and a variable resistor 43 for setting a valve fully-opening state, the variable resistor 43 correcting a driving signal value at the valve fully-opening state. An operational amplifier 48 connected to the level converting section 35 via a buffer 46 and having a variable resistor 47 for setting a valve fully-closing state, the variable resistor 47 correcting a driving signal value at the valve fully-closing state, is connected to the circuit 45. Therefore, when the control signal corresponding to the valve opening degree is outputted from the level converting section 35, the control signal is converted by the variable resistors 43 and 47 including the fixed resistors 41 and 42 to the driving signal corresponding to the valve opening degree and is then outputted to the operational amplifier 38.

In the valve controller 31, a potential of 0 V by which a valve fully-closing manual signal corresponding to a control signal of a fully-closing valve opening degree inputted from the level converting section 35 is supplied to the driving signal control circuit 36 is provided as a valve fully-closing manual signal generating section 51, and the valve fully-closing manual signal generating section is connected to the driving signal control circuit 36. Also in the valve controller 31, a valve fully-closing manual signal generating section 52 by which a valve fully-opening manual signal corresponding to a control signal of a fully-opening valve opening degree inputted from the level converting unit 35 is supplied to the driving signal control circuit 36 is provided.

The valve controller 31 is provided with a mode selecting switch 53. The mode selecting switch 53 is set by the operator at one of three positions, an auto-mode position 53a, a valve fully-opening manual position 53b, and a valve fully-closing manual position 53c which is a neutral position other than the above two positions. When the mode selecting switch 53 is set at the auto-mode position 53a, the level converting section 35 is connected to the driving signal control circuit 36 to convert the control signal to a driving signal. Therefore, the driving signal corresponding to the valve opening degree of the command signal from the main controller 32 is sent to the proportional solenoid valve 10.

When the mode selecting switch 53 is set at the valve fully-closing manual position 53c, 0 V of the valve fully-closing manual signal generating section 51 is inputted into an input section of the driving signal control circuit 36. Thus, a valve fully-closing manual signal with the same value as the semi-normalized signal and a control signal outputted from the level converting section 35 when an instruction to fully close the valve opening degree is given are inputted to the driving signal control circuit 36. On the other hand, when the mode selecting switch 53 is set at the valve fully-opening manual position 53b, the input section of the driving signal control circuit 36 is connected to the valve fully-opening manual signal generating section 52. Thus, a valve fully-opening manual signal with the same value as the semi-normalized signal and a control signal outputted from the level converting section 35 when an instruction to fully open the valve opening degree is given are inputted to the driving signal control circuit 36.

For initial setting of the valve controller 31 connected to the proportional solenoid valve 10, the variable resistor 47 is adjusted under a state where the mode selecting switch 53 is switched to the valve fully-closing manual position 53c. Next, the variable resistor 43 is adjusted under a state where the mode selecting switch 53 is switched to the valve fully-opening manual position 53b. Thereby, when command signals corresponding to the valve fully-closing state and the valve fully-opening state are received from the main controller 32, a voltage of the connection point 37 is changed at a time of fully closing the valve of the driving signal and at a time of fully opening it, and a current value of the driving signal supplied to the driving signal amplifying section 39 via the operational amplifier 38 is corrected.

Therefore, in an actual manufacturing line, for example, there may be used the proportional solenoid valve 10 previously set so as to have a characteristic in which the valve starts to open from the fully-closing state when a driving signal of 50 mA is supplied to the coil 21 and the valve becomes in a fully-opening state when a driving signal of 200 mA is supplied. In such use, there may be the case where the value of the driving signal when the valve starts to open from a fully-closing state and that when the valve becomes in a fully-opening state are different from the previous setting value. The difference is caused by the pressure of the fluid supplied to the primary port 11. In this case, the variable resistors 43 and 47 are manually operated under a state of supplying the pressure of the fluid to the primary port 11 so that the proportional solenoid valve 10 can actuate at a valve fully-closing position and a valve fully-opening position, thereby correcting the values of the driving signals. Once these values of the driving signals are corrected, as for a command signal corresponding to a valve-intermediate opening degree, the driving signal corresponding to the command signal is supplied to the coil 21, and the valve opening degree is set to an opening degree corresponding to the instruction value.

In this manner, the valve fully-closing manual signal generating section 51 and the valve fully-opening manual signal generating section 52 are incorporated in the valve controller 31, and the valve controller 31 can be switched to an auto mode and a manual mode by the mode selecting switch 53. Therefore, the initial setting of the operation characteristic of the valve controller 31 can be performed without inputting from the main controller 32 a valve fully-closing command signal and a valve fully-opening command signal for the initial setting. In the case of carrying out the initial setting, when the mode selecting switch 53 is switched to the valve fully-closing manual position 53c, the valve fully-closing manual signal having the same value as that obtained at a time of inputting a command signal of the valve fully-closing state from the main controller 32 is sent from the valve fully-closing manual signal generating section 51 to the driving signal control circuit 36, irrespectively of whether the command signal is inputted from the main controller 32 or not. On the other hand, when the mode selecting switch 53 is switched to the valve fully-opening manual position 53b, the valve fully-opening manual signal having the same value as that obtained at a time of inputting a command signal of a valve fully-opening state from the main controller 32 is sent from the valve fully-opening manual signal generating section 52 to the driving signal control circuit 36. Therefore, the initial setting can be performed to the valve controller 31 corresponding to the proportional solenoid valve 10 independently from the main controller 32. For this reason, without inputting the command signal from the main controller 32 to the valve controller 31, an operation of the initial setting of the valve controller 31 can be easily performed in accordance with the proportional solenoid valve.

The present invention is not limited to the above embodiments and can be variously modified within a scope of not departing from the gist thereof. The proportional solenoid valve 10 is not limited to the type as shown in FIG. 1, and may not limited to the type as shown in the drawings as long as the valve opening degree can be changed to any opening degree in accordance with the driving signal supplied to the coil 21. Also, the standard driving signal is not limited to the above-described range of 50 to 200 mA, and the valve controller can control the proportional solenoid valve operated by any driving signal depending on the flow rate or pressure of the fluid to be controlled.

INDUSTRIAL APPLICABILITY

The proportional solenoid valve control device according to the present invention is used in a manufacturing line for manufacturing mass products such as industrial products.

The invention claimed is:

1. A proportional solenoid valve control device outputting a driving signal corresponding to a command signal to a solenoid for driving a valve body to control an opening degree of a fluid flow path by the valve body, the control device comprising:

a driving signal control circuit including a valve fully-closing variable resistor that sets a fully-closing value of the driving signal based on a control signal corresponding to a valve fully-closing state and a valve fully-opening variable resistor that sets a fully-opening value of the driving signal based on a control signal corresponding to a valve fully-opening state, the driving signal control circuit converting the control signal corresponding to a valve opening degree to the driving signal and supplying the driving signal to the proportional solenoid valve; and a mode selecting switch set at an auto-mode position for converting the control signal to the driving signal and supplying the driving signal to the proportional solenoid valve, a valve fully-closing manual position for supplying a valve fully-closing manual signal corresponding to a valve fully-closing position of the proportional solenoid valve to the driving signal control circuit, and a valve fully-opening manual position for supplying a valve fully-opening manual signal corresponding to a valve fully-opening position of the proportional solenoid valve to the driving signal control circuit, wherein under a state where the mode selecting switch is set at the valve fully-closing manual position, a value of the driving signal at a time of a valve fully-closing state is corrected by the valve fully-closing variable resistor, and under a state where the mode selecting switch is set at the valve fully-opening manual position, the value of the driving signal at the time of the valve fully-opening state is corrected by the valve fully-opening variable resistor.

2. The proportional solenoid valve control device according to claim 1, further comprising a level converting section converting, based on an exterior command signal, a level of the command signal to generate a control signal.

3. The proportional solenoid valve control device according to claim 2, further comprising an input switching section converting, to a semi-normalized signal corresponding to the valve opening degree, the exterior command signal irrespectively of whether a current loop or voltage signal, and outputting the semi-normalized signal to the level converting section.

4. The proportional solenoid valve control device according to claim 1, further comprising an operational amplifier performing feedback control to the driving signal supplied to the proportional solenoid valve based on a solenoid current detection value from the proportional solenoid valve.

* * * * *